(12) United States Patent
Sotgiu et al.

(10) Patent No.: US 10,746,623 B2
(45) Date of Patent: Aug. 18, 2020

(54) WHEEL BALANCER WITH WIRELESS HANDLE

(71) Applicant: Snap-on Equipment Srl a unico socio, Correggio (IT)

(72) Inventors: Paolo Sotgiu, Modena (IT); Pietro Azzari, Gonzaga (IT); Lillo Gucciardino, Bomporto (IT); Marco Tralli, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 101 days.

(21) Appl. No.: 16/012,587

(22) Filed: Jun. 19, 2018

(65) Prior Publication Data

US 2018/0372576 A1 Dec. 27, 2018

(30) Foreign Application Priority Data

Jun. 23, 2017 (EP) .................................... 17177731

(51) Int. Cl.
*G01M 1/04* (2006.01)
*B60C 25/05* (2006.01)
(Continued)

(52) U.S. Cl.
CPC ......... *G01M 1/045* (2013.01); *B60C 25/0536* (2013.01); *B60C 25/0542* (2013.01); *F16F 15/363* (2013.01); *G01M 1/225* (2013.01)

(58) Field of Classification Search
None
See application file for complete search history.

(56) References Cited

U.S. PATENT DOCUMENTS

| 5,615,574 A | 4/1997 | Dreschler et al. |
| 6,928,871 B2 | 8/2005 | Rothamel |

(Continued)

FOREIGN PATENT DOCUMENTS

| DE | 4229593 A1 | 3/1994 |
| DE | 19713075 A1 | 10/1998 |

(Continued)

OTHER PUBLICATIONS

Extended European Search Report issued in European Application No. 17177731.1 dated Dec. 22, 2017.
(Continued)

*Primary Examiner* — Paul M. West
*Assistant Examiner* — Mark A Shabman
(74) *Attorney, Agent, or Firm* — Miles & Stockbridge, P.C.

(57) ABSTRACT

A wheel clamping system, for reversibly clamping a motor vehicle wheel with a rim onto a wheel servicing machine, includes a handle for acting on a rim of the wheel mounted on a rotatable spindle. The handle has a coupling surface for engaging with clamping jaws of a pull rod when the clamping jaws are open. The handle includes a force detecting device for determining an amount of force exerted by the handle on the rim of the wheel, and a signal emitter operatively connected to the force detecting device. The signal emitter is configured to wirelessly transmit a control signal to a signal receiver of the wheel balancer operatively connected to an actuator causing axial movement of the pull rod when the determined amount of force reaches a predefined threshold, such that the actuator is actuated and the wheel clamping system performs a reversible clamping operation.

20 Claims, 5 Drawing Sheets

(51) Int. Cl.
    *F16F 15/36*          (2006.01)
    *G01M 1/22*         (2006.01)

(56) References Cited

U.S. PATENT DOCUMENTS

| | | | |
|---|---|---|---|
| 8,453,702 B2* | 6/2013 | Corghi | B60C 25/0545 157/1.17 |
| 9,038,692 B2* | 5/2015 | Sotgiu | B60C 25/00 157/20 |
| 9,199,519 B2* | 12/2015 | Bonacini | B60C 25/0545 |
| 2016/0266010 A1* | 9/2016 | Corghi | B60C 25/0536 |

FOREIGN PATENT DOCUMENTS

| | | |
|---|---|---|
| EP | 0550816 A2 | 7/1993 |
| EP | 1391711 A2 | 2/2004 |
| EP | 2639078 A1 | 9/2013 |
| EP | 3067223 A1 | 9/2016 |
| GB | 1188450 A | 4/1970 |

OTHER PUBLICATIONS

Office Action dated Jul. 22, 2019 in corresponding European Application 17177731.1.

\* cited by examiner

WHEEL BALANCER WITH WIRELESS HANDLE

This application claims the benefit of prior-filed European Application No. 17177731.1 filed on Jun. 23, 2017 in the European Patent Office, which is incorporated by reference in its entirety.

The present disclosure relates to a wheel clamping system for reversibly clamping a motor vehicle wheel on a wheel balancer, a wheel balancer having a wheel clamping system, and a method for reversibly clamping a motor vehicle wheel on a wheel balancer using a wheel clamping system.

A wheel clamping system for reversibly clamping a motor vehicle wheel with a rim on a wheel balancer comprises a hollow spindle for mounting a wheel thereon, a turntable for providing an abutment for a wheel mounted on the spindle, a pull rod for pulling a wheel mounted on the spindle into abutment with the turntable, and a handle for acting on a rim of a wheel mounted on the spindle. The spindle defines an axial direction and is coupled to a driving device of the wheel balancer for causing rotational movement of the spindle. The turntable is fixedly connected to the spindle. The pull rod has a first end portion slidably received within the hollow spindle and a second end portion protruding beyond the turntable. The first end portion of the pull rod is coupled to an actuator of the wheel balancer for causing axial movement of the pull rod, and the second end portion of the pull rod is provided with clamping jaws moveable between a closed position and an open position. When the clamping jaws are in the closed position, the clamping jaws are fully received within, or enveloped by, an outer circumference of the spindle, and when the clamping jaws are in the open position, the clamping jaws protrude beyond the outer circumference of the spindle. The handle has a coupling surface for engaging with the clamping jaws when the clamping jaws are in the open position.

An aforementioned wheel clamping system is known, for example, from EP 0 550 816 A2 and EP 1 391 711 A2. In the known wheel clamping systems, when a wheel is mounted on the spindle and an operator seeks to clamp the wheel onto the turntable, the operator slides the handle onto the spindle and actuates a foot pedal so that the clamping jaws of the pull rod engage the handle and pull both the wheel and the handle against the turntable. However, holding the wheel and at the same time actuating the foot pedal can be inconvenient, especially because sight of the foot pedal can be obstructed from view by the wheel.

It is an object of the present disclosure to provide a wheel clamping system for reversibly clamping a motor vehicle wheel with a rim on a wheel balancer that allows clamping the rim of the wheel between the turntable and the handle in a more convenient manner.

According to a first aspect of the present disclosure, this object is solved with the aforementioned wheel clamping system, wherein the handle further comprises at least one force detecting device for determining an amount of force exerted by the handle on the rim of the wheel mounted on the spindle, and at least one signal emitter operatively connected to the at least one force detecting device. The at least one signal emitter is configured to wirelessly transmit a control signal to at least one signal receiver of the wheel balancer operatively connected to the actuator when the determined amount of force reaches a predefined threshold such that the actuator is actuated and the wheel clamping system performs a reversible clamping operation. The wheel preferably is a motor vehicle wheel.

Thus, a wheel mounted on the spindle is clamped onto the turntable when at least a predefined amount of force is exerted onto the rim by an operator by means of the handle. The amount of force is determined by at least one force detecting device and communicated to at least one signal emitter of the handle. A comparison of the determined amount of force with a predefined threshold may be performed by a control unit of the at least one force detecting device or the at least one signal emitter. The amount of force exerted by the handle onto the rim may be determined either directly or indirectly. Preferably, the force detecting device comprises at least one load cell. When the predefined threshold is reached, the at least one signal emitter wirelessly transmits a respective control signal to at least one signal receiver of the wheel balancer which in turn communicates with the actuator. The at least one signal emitter may be integrated into the force detecting device. Alternatively, the at least one signal emitter and the at least one force detecting device may be physically separated from one another. Similarly, the at least one signal receiver may be integrated into the actuator or may be physically separated therefrom. In response to the control signal, the actuator is actuated such that the wheel clamping system performs a clamping or unclamping operation. Communication between the at least one force detecting device and the at least one signal emitter and between the at least one signal receiver and the actuator may be wirelessly, but need not be.

According to a preferred embodiment, the handle comprises a sleeve portion and a cone portion. The sleeve portion may comprise an inner contacting portion with a plurality of grooves for engaging with the clamping jaws, when the clamping jaws are in the open position. The cone portion may be configured to abut against a rim of a wheel mounted on the spindle.

The at least one force detector may be used only for a clamping or an unclamping operation of the wheel clamping system. For example, a clamping operation may be initiated by an operator pushing the handle against a rim of a wheel mounted on the spindle with sufficient force. An unclamping operation may be initiated by actuation of a foot pedal of the wheel balancer. Alternatively, the handle may further comprise an unclamping element operatively connected to the signal emitter for causing wireless transmission of an unclamping signal to the signal receiver. The unclamping element may be configured to be manually actuated by an operator gripping the handle. For instance, the unclamping element may be a push button or a switch provided on the handle.

According to a preferred embodiment, the handle is used to initiate both the clamping and the unclamping operations of the wheel clamping system. To this end, the at least one signal emitter may be configured to wirelessly transmit a clamping signal to the at least one signal receiver when the force exerted by the handle on the rim has a magnitude reaching (from below) or exceeding a first predefined threshold. A clamping signal may eventually cause the actuator to move the pull rod in a first axial direction so as to clamp the wheel onto the turntable. Further, the at least one signal emitter may be configured to wirelessly transmit an unclamping signal to the at least one signal receiver when the force exerted by the handle on the rim has a magnitude reaching (from above) or falling below a second predefined threshold. An unclamping signal may eventually cause the actuator to move the pull rod in a second axial direction so as to unclamp the wheel from the turntable. Preferably, the first predefined threshold is equal to the second predefined threshold. Alternatively, the first predefined threshold may differ from the second predefined threshold.

For safety reasons, the force detecting device may be operatively connected to a control element for controlling the operation of the force detecting device. Alternatively, the signal emitter may be operatively connected to a control element for controlling the wireless transmission of the control signal. The control element may be configured to be manually actuated by an operator. For instance, the control element may be a push button or a switch provided on the handle. Preferably, when the control element is in an activated state, the force detecting device or the signal emitter are activated and allowed to operate. However, when the control element is in a deactivated state, the force detecting device or the signal emitter are deactivated and prevented from operating. The control element may also be brought into an activated state by wirelessly sensing that a foot of an operator is positioned within a slot carved in a frame of the wheel balancer.

Operation of the force detecting device may be triggered by configuring the handle such that a gripping portion of the handle gripped by an operator is axially moveable relative to the rest of the handle. Relative movement between the gripping portion and the rest of the handle may be caused by the handle being pressed against a rim of a wheel that is mounted on the spindle and to be clamped between the handle and the turntable, and by the handle being pulled away from the rim of a wheel that is mounted on the spindle and clamped between the handle and the turntable so as to cause the handle to detach from the rim and thereby unclamp the wheel.

In an exemplary embodiment, the handle comprises inner and outer shells, wherein the force detecting device is mounted on one of the inner and outer shells, and relative movement between the inner and outer shells triggers operation of the force detecting device.

The amount of force exerted by an operator with the handle onto the rim may also be visualized on a display unit.

The first aspect of the present disclosure further relates to a wheel balancer having the above described wheel clamping system.

The first aspect of the present disclosure also relates to a method for reversibly clamping a wheel on a wheel balancer using a wheel clamping system as described above. In order to clamp a wheel mounted on the spindle onto the turntable, the method comprises sliding the handle onto the spindle and pressing the handle into contact with the rim of the wheel with an amount of force which reaches or exceeds a predefined threshold so as to cause the signal emitter to wirelessly transmit a control signal to the signal receiver such that the actuator is actuated and the wheel clamping system performs a reversible clamping operation.

Preferably, the step of pressing the handle into contact with the rim of the wheel is performed with an amount of force exceeding a first predefined threshold so as to cause the signal emitter to wirelessly transmit a clamping signal to the signal receiver. In order to unclamp a wheel mounted on the spindle from the turntable, the method may further comprise the step of pulling on the handle clamping the wheel onto the turntable such that an amount of force exerted on the rim of the wheel by the handle falls below a second predefined threshold. Thereby, the signal emitter is caused to wirelessly transmit an unclamping signal to the signal receiver. The first predefined threshold may be equal to the second predefined threshold, but need not be.

The present disclosure further relates to a wheel clamping system for reversibly clamping a motor vehicle wheel with a rim on a wheel service machine, such as a wheel balancer or a tire changer, a wheel service machine having a wheel clamping system, and a method for reversibly clamping a wheel on a wheel service machine using a wheel clamping system. The second aspect of the present disclosure may be pursued independently from the first aspect of the present disclosure.

When the wheel service machine is a wheel balancer, the general structure of the wheel clamping system for reversibly clamping a wheel on the wheel balancer may be as described above. However, according to the second aspect of the present disclosure, the handle of the wheel clamping system need not be equipped with the above-described force detecting device of the first aspect of the present disclosure.

When the wheel service machine is a tire changer, a wheel clamping system for reversibly clamping a motor vehicle wheel with a rim on the tire changer comprises a spindle for mounting a wheel thereon, a turntable for providing an abutment for a rim of a wheel mounted on the spindle, a fixing element sized to be insertable into the bore of the spindle, and at least one clamping device for reversibly coupling the fixing element to the spindle. The spindle is rotatably supported by the tire changer and defines an axial direction. The spindle comprises a first end portion connected to a driving device of the tire changer for rotating the spindle and a second end portion having a bore. The turntable is coupled to the second end portion of the spindle and is axially moveable relative to the spindle. The fixing element comprises a contact portion for abutting against a rim of a wheel mounted on the spindle, and a shaft having a first end portion insertable into the bore of the spindle and a second end portion to which the contact portion is attached. The shaft of the fixing element has a coupling surface for coupling with the clamping device so as to lock the axial position of the contact portion of the fixing element relative to the spindle.

The rim of a wheel usually is a delicate structure which should be handled with great care during a clamping or service operation of the wheel. Known wheel clamping systems for wheel service machines, however, may overtighten the rim during the clamping procedure which may cause the rim to deform. Distortion of the wheel rim can have a significant influence on the performance of the vehicle equipped with the wheel and should therefore be avoided.

It is therefore another object of the present disclosure to provide a wheel clamping system for reversibly clamping a motor vehicle wheel on a wheel service machine, such as a wheel balancer or a tire changer, that reduces the risk of deforming a rim of a motor vehicle wheel during a clamping operation.

According to the second aspect of the present disclosure, this object is solved by a wheel clamping system for reversibly clamping a wheel with a rim on a wheel service machine, such as a wheel balancer or a tire changer, wherein the wheel clamping system comprises at least one force detecting device for determining a valve of a clamping force exerted on a rim of a wheel mounted on the spindle by the wheel clamping system. In this way, the clamping force, e.g. its value or evolution, can be used to ensure adequate clamping or handling of the wheel and its rim during a clamping or service operation.

Generally, a force detecting device is made up a force transducer and an associated measuring unit. The force transducer is subjected to the force to be detected or measured, and some resultant change in another measurable physical quantity (e.g. electrical resistance) of the force transducer is measured by the measuring unit. The measuring unit may comprise a signal conditioner and, if required, an analogue to digital converter. An energy source may be provided to power the force transducer.

According to the second aspect of the present disclosure, the measuring unit may process the output received from the force transducer before it is communicated to an output unit. For example, the output unit may be an indicator device or a sound generating device, and the output of the force transducer may then be shown on the indicator device to be read by an operator or converted by the sound generating device into an acoustic signal to be heard by an operator. The indicator device, such as a digital indicator, may give the value of the measurement in units of force or in non-force units, such as volts.

Since the clamping force may rapidly change during a clamping operation, it may be desirable, alternatively or additionally, that the force detecting device communicates the output directly to a control unit with a data acquisition unit, such as a microcontroller. The output may then be communicated to and displayed on a display to an operator.

A skilled person understands that there are many types of force transducer, and these may be used with instrumentation of varying complexity. For example, strain gauge load cells are a widely used type of force transducer.

Preferably, the force transducer is built in as an integral part of the wheel clamping system. Further, it is desirable that the force transducer is mounted as close to the wheel in its clamped state as is practical. The measuring unit, however, may be located at a distance away from the least one force detecting device. By way of example, a force detecting device may be operatively connected to the turntable or the spindle, or a component linked thereto, of a wheel clamping system according to the second aspect of the present disclosure. Additionally or alternatively, in a wheel clamping system for a wheel balancer, a force detecting device may be operatively connected to the handle, and in a wheel clamping system for a tire changer, a force detecting device may be operatively connected to the fixing element. In the latter case, the force transducer may be provided on the contact portion or the shaft of the fixing element.

When the force detecting device is used in a tire changer that is equipped with a working tool, the force detecting device may also be used to determine a value of a force or torque that the working tool exerts on the wheel during mounting a tire on or demounting a tire from the wheel rim.

The second aspect of the present disclosure further relates to a wheel service machine, such a wheel balancer or tire changer, having the above described wheel clamping system.

The second aspect of the present disclosure further relates to a method for reversibly clamping a wheel with a rim on a wheel balancer using a above described wheel clamping system. The method comprises the step of clamping a rim of a wheel mounted on the spindle between the handle and the turntable, and determining a value of a clamping force acting on the rim of the wheel using the at least one force detecting device.

The second aspect of the present disclosure further relates to a method for reversibly clamping a wheel with a rim on a tire changer using an above described wheel clamping system. The method comprises the steps of clamping a rim of a wheel mounted on the spindle between the contact portion of the fixing element and the turntable, and determining a value of a clamping force acting on the rim of the wheel using the at least one force detecting device. This method may further comprise the step of determining with the force detecting device a value of a force or torque generated by a working tool of the tire changer during mounting a tire on or demounting a tire from the rim of the wheel.

Preferably, either method may further comprise the step of visualizing on a display device the determined value of a clamping force acting on the rim of the wheel.

Again preferably, either method may further comprise the step of controlling the clamping operation based on the determined value of a clamping force acting on the rim of the wheel.

Still preferably, either method may further comprise the step of warning an operator of an incorrect clamping operation or position based on the determined value of a clamping force acting on the rim of the wheel.

Further objects, features and advantages of the invention will be apparent from the following description of a preferred embodiment of the first and second aspects of the present disclosure, with reference to the accompanying drawings, in which.

Figure 1:
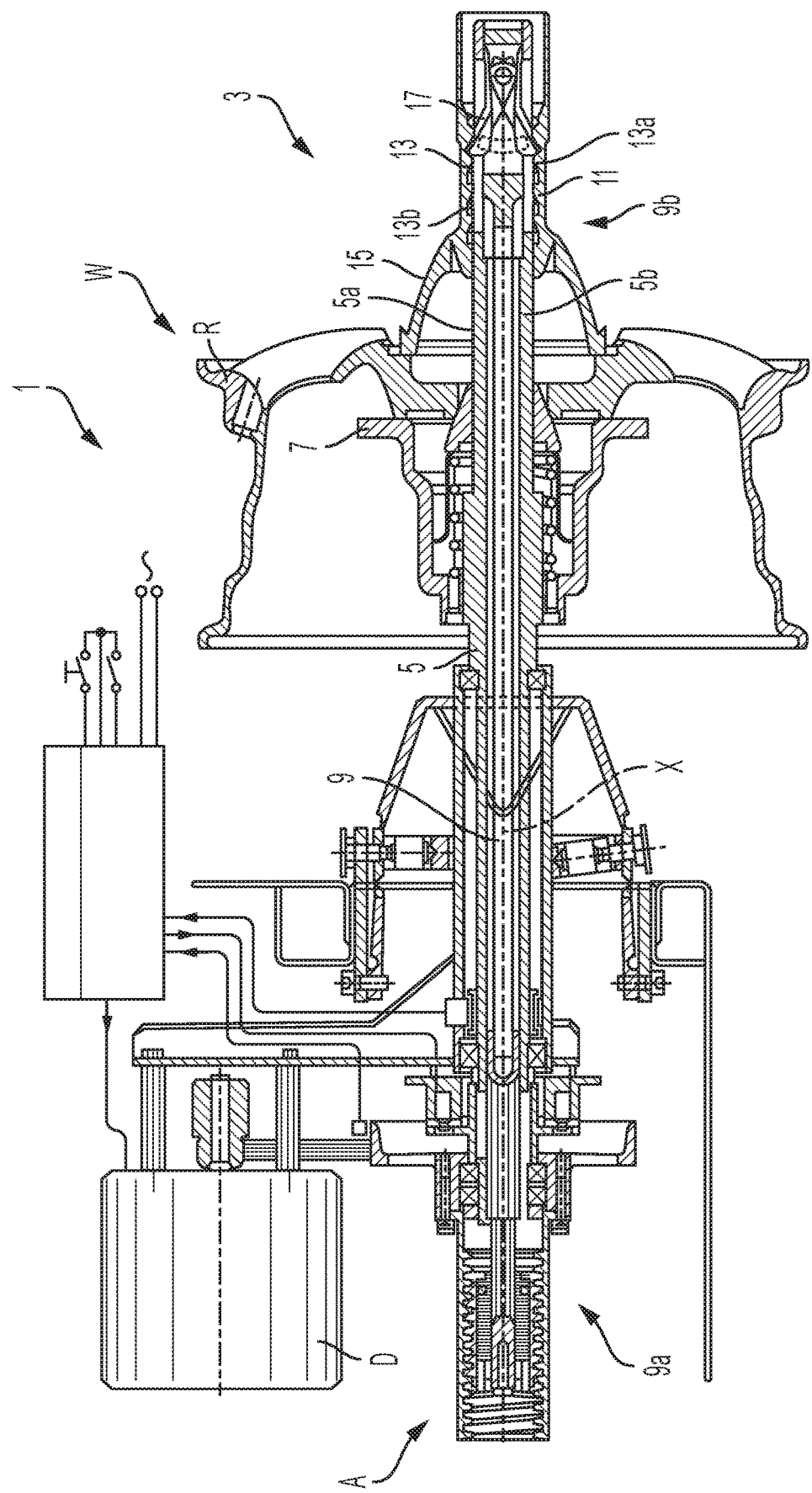
FIG. 1 shows a wheel clamping system of a wheel balancer of the prior art.

FIG. 1 shows a wheel balancer 1 of EP 1 391 711 A2 with a wheel clamping system 3. The wheel clamping system 3 is used for reversibly clamping a wheel W on the wheel balancer 1.

The wheel clamping system 3 comprises a hollow spindle 5, a turntable 7, a pull rod 9, and a handle 11. The handle 11 comprises a sleeve portion 13 and a cone portion 15. The sleeve portion 13 can be gripped by an operator. The hollow spindle 5 defines an axial direction X. The wheel balancer 1 rotatably supports the hollow spindle 5. The hollow spindle 5 is coupled to a driving device D of the wheel balancer 1 for causing rotational movement of the hollow spindle 5. The turntable 7 is fixedly connected to the hollow spindle 5. The pull rod 9 has a first end portion 9a slidably received within the hollow spindle 5, and a second end portion 9b, opposite the first end portion 9a, protruding beyond the turntable 7. The first end portion 9a of the pull rod 9 is coupled to an actuator A of the wheel balancer 1 for causing axial movement of the pull rod 9. The second end portion 9b of the pull rod 9 is provided with clamping jaws 17 which are moveable between a closed position and an open position. For instance, an elastic element, such as a spring, may be provided between the clamping jaws 17 to cause transition from the closed position to the open position. When the clamping jaws 17 are in the open position, they protrude beyond an outer circumference 5a of the spindle 5. The sleeve portion 13 of the handle 11 has a coupling surface 13a with grooves 13b for engaging with the clamping jaws 17 when in their open position. When in the closed position, the clamping jaws 17 are fully enveloped by, or received within, the outer circumference 5a of the hollow spindle 5.

Figure 2:
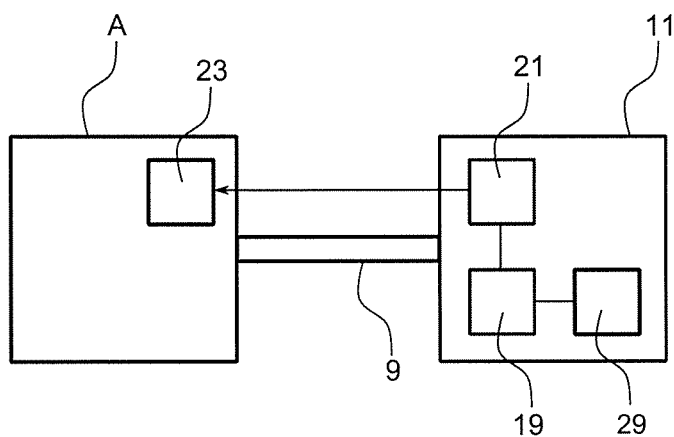
FIG. 2 shows the present invention in a highly schematic manner.

According to the first aspect of the present disclosure, as schematically illustrated in FIG. 2, the handle 11 comprises a force detecting device 19 for determining an amount of force exerted by the handle 11 on the rim R of the wheel W mounted on the hollow spindle 5. The handle 11 further comprises a signal emitter 21 operatively connected to the force detecting device 19. The actuator A comprises a signal receiver 23 for receiving the control signals wirelessly transmitted by the signal emitter 21. In FIG. 2, the handle 11 further comprises a control element 29, such as a switch, for controlling the operation of the force detecting device 19, such as by switching it on and off.

When the force detecting device 19 determines that an amount of force exerted by the handle 11 on the rim R of the wheel W mounted on the hollow spindle 5 reaches a predefined threshold, the signal emitter 21 is configured to wirelessly transmit a control signal to the signal receiver 23. The signal receiver 23 then causes actuation of the actuator A connected to the pull rod 9 such that the wheel clamping system 3 performs a reversible clamping operation on the wheel W.

Figure 3:
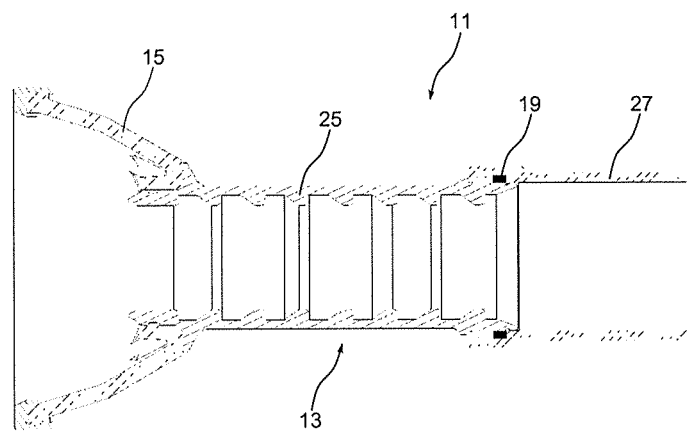
FIG. 3 shows a handle with inner and outer shells.

FIG. 3 illustrates a handle 11 with an inner shell 25 and an outer shell 27. The outer shell 27 is configured to be gripped by an operator and is axially translatable relative to the inner shell 25, in particular when the cone portion 15 abuts against a rim R of a wheel W. The relative axial movement between the inner shell 25 and the outer shell 27 triggers the force detecting device 19.

In the following, the use of the wheel clamping system 3 is described. When a wheel W mounted on the hollow spindle 5 is to be clamped onto the turntable 7 using the handle 11, an operator slides the handle 11 onto the hollow spindle 5 and presses the handle 11 into contact with the rim R of the wheel W. When the amount of pressing force exerted on the rim R of the wheel W by the handle 11 reaches (from below) or exceeds a first predefined threshold, the signal emitter 21 wirelessly transmits a clamping signal to the signal receiver 23. A clamping command is communicated by the signal receiver 23 to the actuator A which pulls the pull rod 9 in a direction away from the turntable 7 and thereby the handle 11 toward the turntable 7 until the wheel W is securely clamped between the turntable 7 and the handle 11. The handle 11 is pulled along with the pull rod 9 due to the interaction of the clamping jaws 17, which have transitioned to their open position, and the sleeve portion 13 of the handle 11.

In order to unclamp the wheel R from the turntable 7, an operator pulls on the handle 11 until the force exerted by the handle 11 on the rim R of the wheel W reaches (from above) or falls below a second predefined threshold. Preferably, the first and second predefined thresholds are equal. The signal emitter 21 then wirelessly transmits an unclamping signal to the signal receiver 23 which is communicated to the actuator A in the form of an unclamping command.

In response, the actuator A pushes the pull rod 9 in a direction toward the turntable 7 and thereby the handle 11 away from the turntable 7 until the wheel W is unclamped from the turntable 7 and the handle 11 can be slid off the hollow spindle 5.

Figure 4:
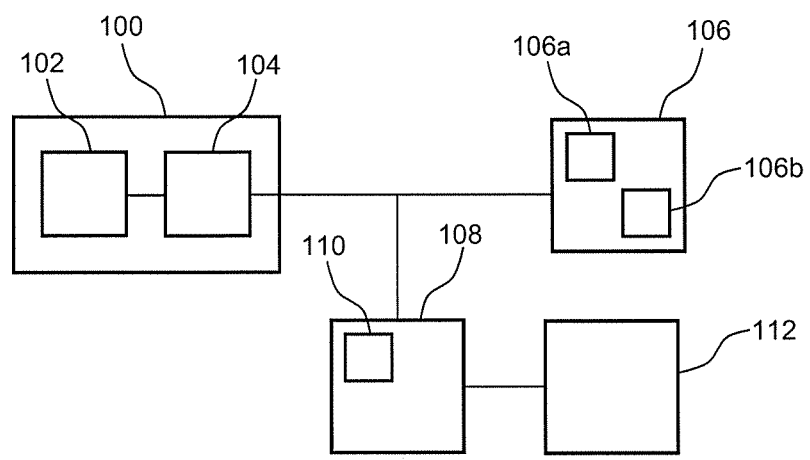
FIG. 4 shows the operation of a force detecting device of a wheel clamping system of a wheel balancer according to the second aspect of the present disclosure in a highly schematic manner.

In addition or as an alternative to the presence of the force detecting device 19 in a wheel clamping system according to the first aspect of the present disclosure, the wheel clamping system 3 according to the second, possibly independent aspect of the present disclosure may comprises at least one second force detecting device. FIG. 4 schematically shows a possible operation of a second force detecting device 100. The second force detecting device 100 comprises a force transducer 102 and a measuring unit 104 operatively connected to the force transducer 102. The force transducer 102 is understood as the part of the force detecting device 100 which converts the applied force into an output which is measured by the measuring unit 104. The measuring unit 104 may be operatively connected to an output unit 106. The output unit 106 may be an indicator device 106a, such as a digital indicator, or a sound generating device 106b, such as a speaker. Also, the measuring unit 104 may be operatively connected to a control unit 108. The control unit 108 may comprise a data acquisition unit 110 to adequately handle the measurement of quickly changing clamping forces. The control unit 108 may in turn be operatively connected to a display device 112 to be read by an operator. It is then possible for an operator observing the display device 112 to control the clamping operation based on the magnitude or progression of the clamping force. The connections illustrated in FIG. 4 may be embodied by a physical connection, such as by wires, or a wireless connection.

Figure 5:
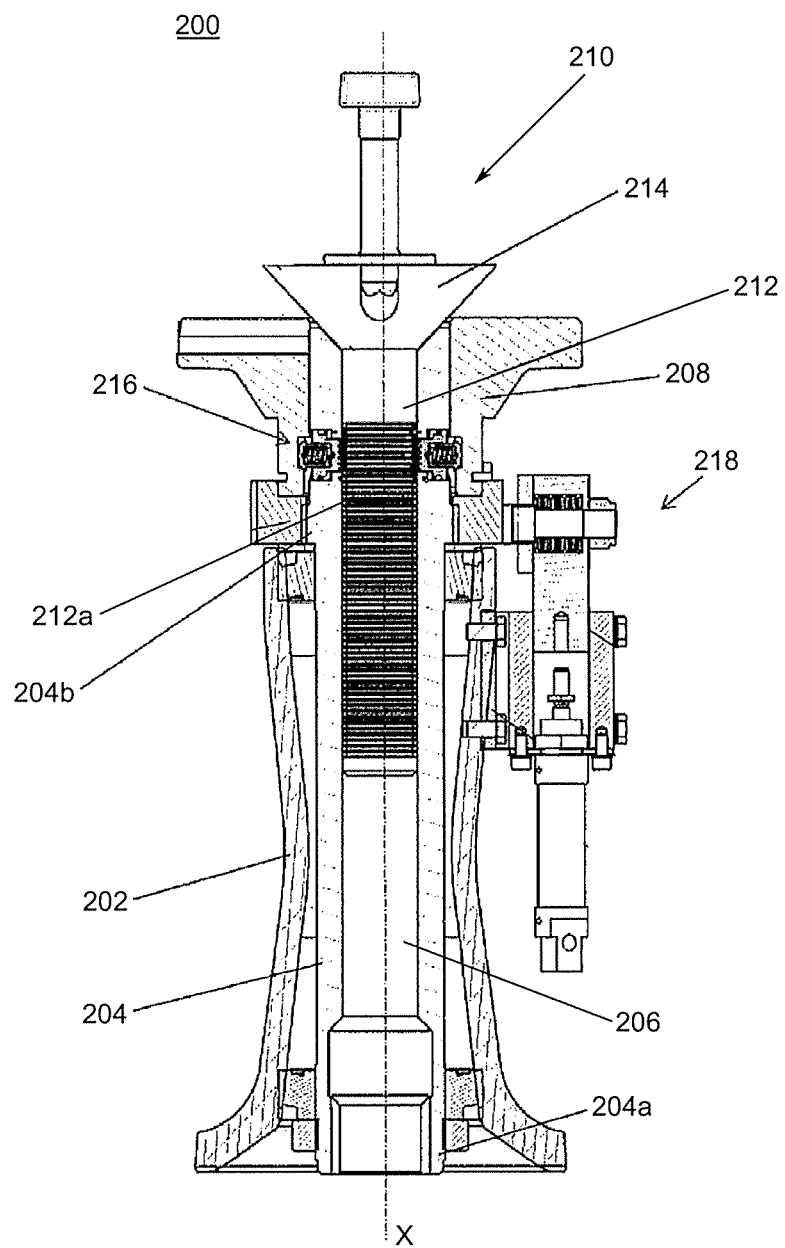
FIG. 5 shows a wheel clamping system of a tire changer of the prior art.

FIG. 5 shows a wheel clamping system 200 of a tire changer according to EP 2 639 078 A1. The wheel clamping system 200 comprises a frame 202, a spindle 204 with a bore 206, a turntable 208, a fixing element 210 with a shaft 212 and a contact portion 214, and a clamping device 216. The spindle 204 comprises a first end portion 204a and a second end portion 204b opposite the first end portion 204a. At the first end portion 204a, the spindle 204 connected to a driving device (not shown) of the tire changer 200. The bore 206 may be provided at the second end portion 204b, but may extend also into the first end portion 204a or along the entire length of the spindle 204. The turntable 208 has a through bore 208a which receives the spindle 204. The turntable 208 is coupled to the second end portion 204b in such a way so as to be axially moveable relative to the spindle 204. For example, the outer surface of the spindle 204 and an inner surface of the through bore 208a may be in a threaded engagement which allows relative axial movement between the turntable 208 and the spindle 204. The cooperation between the turntable 208 and the spindle 204 is described in more detail in EP 2 639 078 A1.

The shaft 212 of the fixing element 210 is sized so as to be insertable into the bore 206 of spindle 204. The contact portion 214 is sized so as to come into abutment against a rim of a wheel positioned on the turntable 208. The shaft 212 of the fixing element 210 has a coupling surface 212a which engages with the clamping device 216 so as to lock the axial position of the contact portion of the fixing element 210 relative to the spindle 204. The cooperation between the clamping device 216 and the fixing element 210 is described in more detail in EP 2 639 078 A1.

According to the second aspect of the present disclosure, the wheel clamping system 200 of a tire changer is equipped with at least one force detecting device. Regarding the force detecting device, reference is made to the description of the force detecting device 100 which was discussed with respect to the wheel clamping system 3 of a wheel balancer 1. The force detecting device 100 may be operatively connected to the spindle 204, the turntable 208 or the fixing element 212.

When working with a tire changer having a working tool, the force detecting device 100 may also be used to determine a value of a force or torque that the wheel is subjected to by the working tool during mounting a tire on or demounting a tire from the wheel rim.

When a wheel (not shown) with its rim is to be reversibly clamped on the tire changer with the wheel clamping system 200, the wheel rim is mounted on the spindle 204 and positioned on the turntable 208. Then, the shaft 212 of the fixing element 210 is inserted into the bore 206 of the spindle 204 and the contact portion 214 is brought into abutment with the wheel rim. The wheel can now be clamped by the wheel clamping system 200. To this end, the driving device rotates the spindle 204 in a first direction, while the turntable 208 is held in a rotationally fixed position, preferably by a stopping device 218, and is caused to move in the axial direction X along the spindle 204. This in turn triggers actuation of two clamping devices 216 which move into engagement with the coupling surface 212a of the shaft 212 of the fixing element 210. According to the second aspect of the present disclosure, the development of the clamping force exerted by the wheel clamping system 200 on the wheel rim is determined by the force detecting device 100 and may thus be monitored as described above for the wheel clamping system 100.

To unclamp the wheel from the wheel clamping system 200, the driving device rotates the spindle 204 in a second direction opposite the first direction.

The clamping and unclamping operation of the wheel clamping system 200 is described in more detail in EP 2 639 078 A1.

The invention claimed is:

1. A wheel clamping system for reversibly clamping a motor vehicle wheel with a rim on a wheel balancer, comprising:
   a hollow spindle for mounting a wheel thereon, the spindle defining an axial direction and being coupled to a driving device of the wheel balancer for causing rotational movement of the spindle;
   a turntable for providing an abutment for a rim of a wheel mounted on the spindle, the turntable being fixedly connected to the spindle and configured to abut against a wheel mounted on the spindle;
   a pull rod for pulling a wheel mounted on the spindle into abutment with the turntable, the pull rod having a first end portion slidably received within the spindle and a second end portion protruding beyond the turntable, wherein the first end portion is coupled to an actuator of the wheel balancer for causing axial movement of the pull rod, and the second end portion is provided with clamping jaws moveable between a closed position and an open position, wherein, when the clamping jaws are in the closed position, the clamping jaws are fully received within an outer circumference of the spindle, and when the clamping jaws are in the open position, the clamping jaws protrude beyond the outer circumference of the spindle; and
   a handle for acting on a rim of a wheel mounted on the spindle, the handle having a coupling surface for engaging with the clamping jaws when the clamping jaws are in the open position;
   characterized in that the handle further comprises at least one force detecting device for determining an amount of force exerted by the handle on the rim of the wheel mounted on the spindle, and at least one signal emitter operatively connected to the at least one force detecting device,
   wherein the at least one signal emitter is configured to wirelessly transmit a control signal to at least one signal receiver of the wheel balancer operatively connected to the actuator when the determined amount of force reaches a predefined threshold such that the actuator is actuated and the wheel clamping system performs a reversible clamping operation.

2. The wheel clamping system of claim 1, wherein the handle comprises a sleeve portion and a cone portion, wherein the sleeve portion comprises an inner contacting portion with a plurality of grooves for engaging with the clamping jaws and the cone portion is configured to abut against a rim of a wheel mounted on the spindle.

3. The wheel clamping system of claim 2, wherein the at least one signal emitter is configured to wirelessly transmit a clamping signal to the at least one signal receiver when the force exerted by the handle on the rim of the wheel has a magnitude which exceeds a first predefined threshold, and to wirelessly transmit an unclamping signal to the at least one signal receiver when the force exerted by the handle on the rim of the wheel has a magnitude which falls below a second predefined threshold, wherein a clamping signal causes the actuator to move the pull rod in a first axial direction so as to clamp the wheel onto the turntable, and an unclamping signal causes the actuator to move the pull rod in a second axial direction so as to unclamp the wheel from the turntable.

4. The wheel clamping system of claim 3, wherein the first predefined threshold is equal to the second predefined threshold.

5. The wheel clamping system of claim 4, wherein the at least one force detecting device comprises at least one load cell.

6. The wheel clamping system of claim 5, wherein a gripping portion of the handle gripped by an operator is axially moveable relative to the rest of the handle so as to trigger operation of the force detecting device.

7. The wheel clamping system of claim 6, wherein the handle comprises an inner shell and an outer shell, wherein the force detecting device is mounted on one of the inner and outer shells, and relative movement between the inner and outer shells triggers operation of the force detecting device.

8. The wheel clamping system of claim 7, wherein the force detecting device is operatively connected to a control element for controlling the operation of the at least one force detecting device.

9. The wheel clamping system of claim 1, wherein the at least one signal emitter is configured to wirelessly transmit a clamping signal to the at least one signal receiver when the force exerted by the handle on the rim of the wheel has a magnitude which exceeds a first predefined threshold, and to wirelessly transmit an unclamping signal to the at least one signal receiver when the force exerted by the handle on the rim of the wheel has a magnitude which falls below a second predefined threshold, wherein a clamping signal causes the actuator to move the pull rod in a first axial direction so as to clamp the wheel onto the turntable, and an unclamping signal causes the actuator to move the pull rod in a second axial direction so as to unclamp the wheel from the turntable.

10. The wheel clamping system of claim 9, wherein the first predefined threshold is equal to the second predefined threshold.

11. A method for reversibly clamping a wheel on a wheel balancer using a wheel clamping system of claim 9, wherein a wheel is mounted on the spindle, the method comprising sliding the handle onto the spindle and pressing the handle into contact with the rim of the wheel with a force having a magnitude which exceeds a predefined threshold so as to cause the at least one signal emitter to wirelessly transmit a control signal to the signal receiver such that the actuator is actuated and the wheel clamping system performs a reversible clamping operation.

12. The method of claim 11, wherein a wheel is mounted on the spindle, wherein the step of pressing the handle into contact with the rim of the wheel is performed with an amount of force exceeding a first predefined threshold so as to cause the at least one signal emitter to wirelessly transmit a clamping signal to the at least one signal receiver, and the method further comprises the step of pulling on the handle clamping the wheel onto the turntable such that an amount of force exerted on the rim of the wheel by the handle falls below a second predefined threshold so as to cause the at least one signal emitter to wirelessly transmit an unclamping signal to the signal receiver.

13. The wheel clamping system of claim 1, wherein the at least one force detecting device comprises at least one load cell.

14. The wheel clamping system of claim 1, wherein a gripping portion of the handle gripped by an operator is axially moveable relative to the rest of the handle so as to trigger operation of the force detecting device.

15. The wheel clamping system of claim 14, wherein the handle comprises an inner shell and an outer shell, wherein the force detecting device is mounted on one of the inner and outer shells, and relative movement between the inner and outer shells triggers operation of the force detecting device.

16. The wheel clamping system of claim 1, wherein the force detecting device is operatively connected to a control element for controlling the operation of the at least one force detecting device.

17. A wheel balancer having a wheel clamping system of claim 1.

18. A method for reversibly clamping a wheel on a wheel balancer using a wheel clamping system of claim 1, wherein a wheel is mounted on the spindle, the method comprising sliding the handle onto the spindle and pressing the handle into contact with the rim of the wheel with a force having a magnitude which exceeds a predefined threshold so as to cause the at least one signal emitter to wirelessly transmit a control signal to the signal receiver such that the actuator is actuated and the wheel clamping system performs a reversible clamping operation.

19. The wheel clamping system of claim 1, wherein the at least one force detecting device comprises a control unit configured to perform a comparison of the determined amount of force and the predefined threshold.

20. The wheel clamping system of claim 1, wherein the at least one signal emitter comprises a control unit configured to perform a comparison of the determined amount of force and the predefined threshold.

* * * * *